Patented Nov. 7, 1944

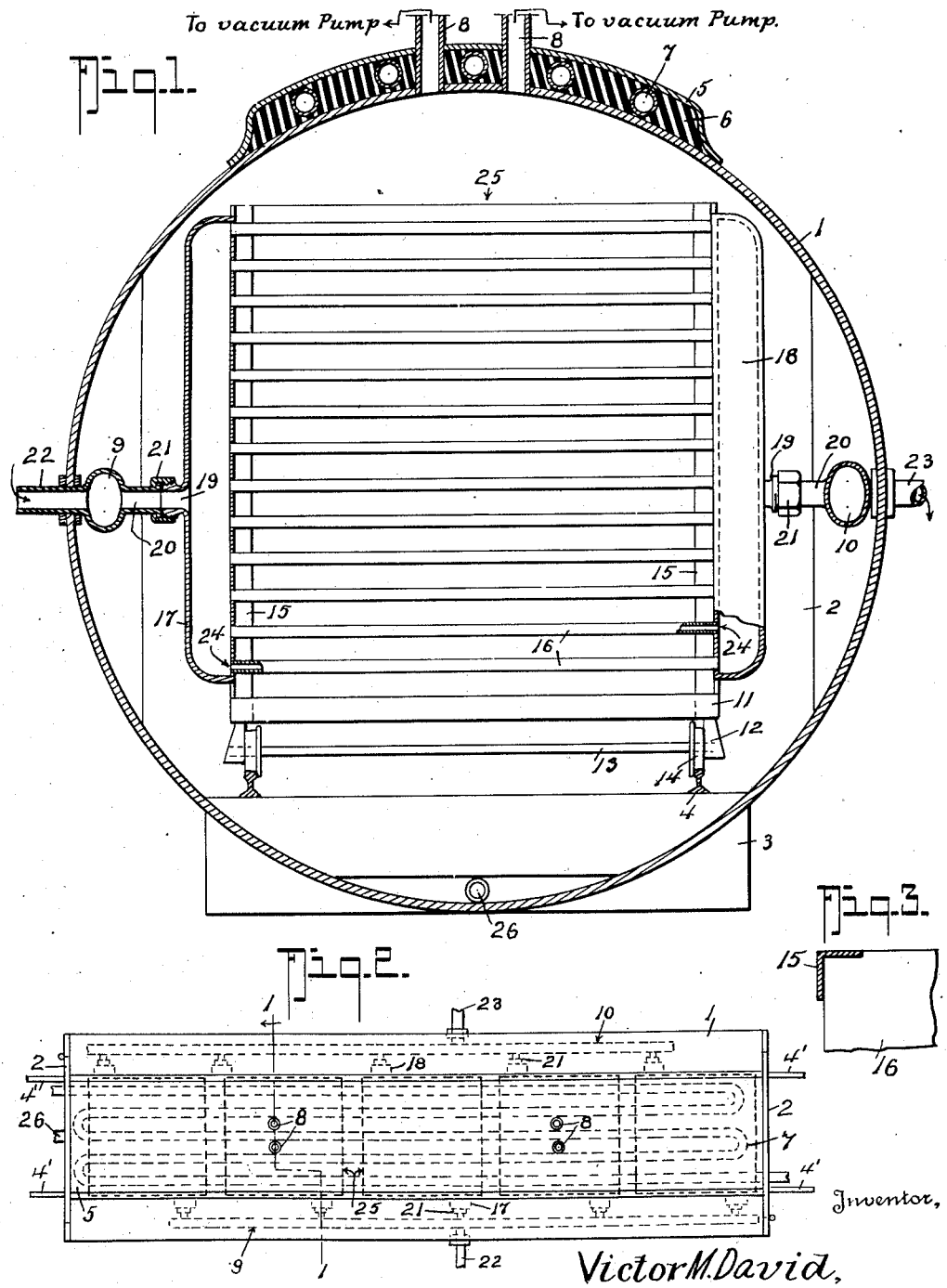

2,362,117

UNITED STATES PATENT OFFICE 2,362,117

RETORT

Victor M. David, Vancouver, British Columbia, Canada

Application March 21, 1944, Serial No. 527,462

7 Claims. (Cl. 34—92)

My invention relates to retorts for use in processing fish, especially de-hydrating same.

The invention has for its object to provide a simple, efficient and inexpensive apparatus for use in conducting the process disclosed in my application Serial Number 501,471.

Other objects will in part be obvious and in part be pointed out hereinafter.

To the attainment of the aforesaid objects and ends the invention also resides in the novel details of construction, combination, and arrangement of parts, all of which will hereinafter be first described in the detailed description to follow and then be specifically pointed out in the appended claims, reference being had to the accompanying drawing, in which—

Fig. 1 is an enlarged cross section on the line 1—1 of Fig. 2.

Fig. 2 is a top plan view of a retort embodying my invention.

Fig. 3 is a detail view hereinafter referred to.

In the drawing in which like numerals indicate like parts in all the figures, 1 is a tubular body or vessel having end doors 2 and being suitably supported, as at 3, to maintain the retort in a fixed position.

Within the retort is a trackway 4 which joins with an outside trackway 4¹ (see Fig. 2).

The top or dome portion of the retort vessel 1 is provided with suitable heat insulation 6 under a cover or shield 5. A heating element 7 is embedded in the insulation 6. The heating element may be electric, steam or hot water conductors, steam pipes being shown for purposes of illustration.

One or more, preferably at least two, pipes 8 run to a suitable vacuum producer or pump (not shown) and communicate with the interior of the vessel to enable the production of a more or less of a vacuum within the retort as required in the above mentioned process.

Suitably mounted along one side of the retort and extending approximately the length thereof is a manifold 9 to which heating substance is delivered via a fluid conveying means 22. Similarly mounted on the opposite side of the retort is a manifold 10 from which the heating substance exists via a delivery means 23.

The heating substance manifold 9 has a number of suitably spaced heating substance conductors 20, while the outlet manifold 10 also has a number of suitably spaced heating substance conductors 20.

The trucks 25 which each comprise a base 11 have axle bearings 12 for the axles 13 that have flanged wheels 14 to run on the tracks 4, 4¹. Angle iron corner posts 15 carry a vertical set of spaced, horizontally disposed shelves 16 having means 24 for receiving a suitable heating substance. Each truck has a heating substance inlet manifold 17 and an exhaust or outlet manifold 18. The manifolds 17 and 18 have heating substance conductors or connecting elements 19 which are connectable to the conductors 20 by suitable couplings 21.

When the heating substance used is steam or hot water the manifolds 9 and 10 comprise hollow ducts as do also the elements 19, 20, 17, 18, and the shelves 16 are hollow and communicate at 24 with the manifolds 17 and 18. When however, the heating medium used is electricity the shelves 16 enclose electric heating coils, the manifolds 17 and 18 then comprise the connections between the heating coils of the various shelves, the connections 19, 21, 20 comprise electrical connector-plugs to plug into the manifolds (bus bars) 9 and 10 and the elements corresponding to 22 and 23 will be the positive and negative connections, respectively, with an external circuit.

In order to eliminate condensed fluid from the retort 1 a suitable drain outlet 26 may be provided.

In using my present invention the fish to be processed (dehydrated) is placed, on suitable trays (not shown), on the shelves 16 and the trucks rolled into the retort. The connections 21 are made and the retort closed. Heating substance is admitted through the inlet or intake 22 and out via outlet or offtake 23, thus heating the shelves 16 to the desired degree. At the proper time the exhaust pump or pumps (not shown) connected to pipes 8 draw the desired vacuum in the retort 1. The vapors being at the same time prevented from condensing over the trucks because of the heated top or dome of the retort, due to the heating device on top of the retort.

Upon completion of the process to which the fish are subjected (see my application Serial Number 501,471 aforesaid) the heat and vacuum pumps are cut-off, the doors 2 opened, connections 21 released and the trucks pushed or pulled out.

While I have referred to the treatment of fish with my retort it is obvious it may be used in dehydrating and cooking other food products, etc.

From the foregoing description taken with the accompanying drawing it is thought the construction, operation and advantages of the invention will be clear to those skilled in the art.

What I claim is:

1. A tubular retort having closed ends, at least one of which is provided with a door, a track-way running lengthwise of the retort, a heating substance intake manifold along one side of the retort and a heating substance outlet manifold along the opposite side of the retort, each of said manifolds having suitably spaced connecting elements within the retort, means for heating the top or dome of the retort, and at least one truck having wheels to ride on said track-way and including a set of horizontal shelves disposed one on top of another and spaced apart, individual intake and outlet heating substance conducting manifolds for each truck, means for coupling said individual manifolds with the respective manifolds of the retort, and means to produce a suitable vacuum within the retort.

2. A horizontally disposed tubular retort having closed ends, at least one of said ends having a door, tracks disposed along the inside of said retort adjacent the bottom thereof, trucks to run on said tracks, a heating fluid inlet manifold duct mounted lengthwise along the inner side of the retort, a similar outlet manifold duct along the inner side of the retort opposite the first mentioned manifold duct, each truck including a plurality of hollow, horizontally disposed, vertically spaced apart shelves, individual intake and outlet and outlet manifolds carried by each said trucks and communicating with the interiors of the shelves, and detachable connections between the manifolds of the retort and the respective manifolds of the trucks within the retort.

3. A horizontally disposed tubular retort having closed ends, at least one of said ends having a door, tracks disposed along the inside of said retort adjacent the bottom thereof, trucks to run on said tracks, a heating fluid inlet manifold duct mounted lengthwise along the inner side of the retort, a similar outlet manifold duct along the inner side of the retort opposite the first mentioned manifold duct, each truck including a plurality of hollow, horizontally disposed, vertically spaced apart shelves, individual intake and outlet manifolds carried by each said trucks and communicating with the interiors of the shelves, and detachable connections between the manifolds of the retort and the respective manifolds of the trucks within the retort, and means for producing a suitable vacuum within the retort.

4. A horizontally disposed tubular retort having closed ends, at least one of said ends having a door, tracks disposed along the inside of said retort adjacent the bottom thereof, trucks to run on said tracks, a heating fluid inlet manifold duct mounted lengthwise along the inner side of the retort, a similar outlet manifold duct along the inner side of the retort opposite the first mentioned manifold duct, each truck including a plurality of hollow, horizontally disposed, vertically spaced apart shelves, individual intake and outlet manifolds carried by each said trucks and communicating with the interiors of the shelves, and detachable connections between the manifolds of the retort and the respective manifolds of the trucks within the retort, and means for heating the top of the retort for purposes described.

5. A horizontally disposed tubular retort having closed ends, at least one of said ends having a door, tracks disposed along the inside of said retort adjacent the bottom thereof, trucks to run on said tracks, a heating fluid inlet manifold duct mounted lengthwise along the inner side of the retort, a similar outlet manifold duct along the inner side of the retort opposite the first mentioned manifold duct, each truck including a plurality of hollow, horizontally disposed, vertically spaced apart shelves, individual intake and outlet manifolds carried by each said trucks and communicating with the interiors of the shelves, and detachable connections between the manifolds of the retort and the respective manifolds of the trucks within the retort, and means for producing a suitable vacuum within the retort, and means for heating the top of the retort for purposes described.

6. A horizontally disposed tubular retort having closed ends, at least one of said ends having a door, tracks disposed along the inside of said retort adjacent the bottom thereof, trucks to run on said tracks, a heating fluid inlet manifold duct mounted lengthwise along the inner side of the retort, a similar outlet manifold duct along the inner side of the retort opposite the first mentioned manifold duct, each truck including a plurality of hollow, horizontally disposed, vertically spaced apart shelves, individual intake and outlet manifolds carried by each said trucks and communicating with the interiors of the shelves, and detachable connections between the manifolds of the retort and the respective manifolds of the trucks within the retort, and means for heating the top of the retort for purposes described, said last named means including heating elements embedded in insulation and mounted along the top of the retort.

7. A horizontally disposed tubular retort having closed ends, at least one of said ends having a door, tracks disposed along the inside of said retort adjacent the bottom thereof, trucks to run on said tracks, a heating fluid inlet manifold duct mounted lengthwise along the inner side of the retort, a similar outlet manifold duct along the inner side of the retort opposite the first mentioned manifold duct, each truck including a plurality of hollow, horizontally disposed, vertically spaced apart shelves, individual intake and outlet manifolds carried by each said trucks and communicating with the interiors of the shelves, and detachable connections between the manifolds of the retort and the respective manifolds of the trucks within the retort, and means for producing a suitable vacuum within the retort, and means for heating the top of the retort for purposes described, said last named means including heating elements embedded in insulation and mounted along the top of the retort.

VICTOR M. DAVID.